US 12,510,348 B2

(12) United States Patent
Sugimoto

(10) Patent No.: US 12,510,348 B2
(45) Date of Patent: Dec. 30, 2025

(54) ACQUIRING APPARATUS, ACQUIRING METHOD, AND OPTICAL SYSTEM MANUFACTURING METHOD

(71) Applicant: CANON KABUSHIKI KAISHA, Tokyo (JP)

(72) Inventor: Tomohiro Sugimoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 328 days.

(21) Appl. No.: 18/461,708

(22) Filed: Sep. 6, 2023

(65) Prior Publication Data

US 2024/0085269 A1 Mar. 14, 2024

(30) Foreign Application Priority Data

Sep. 13, 2022 (JP) ................ 2022-145622

(51) Int. Cl.
  *G01B 9/02015* (2022.01)
  *G01B 9/0209* (2022.01)
  (Continued)

(52) U.S. Cl.
  CPC ......... *G01B 9/0203* (2013.01); *G01B 9/0209* (2013.01); *G01B 11/14* (2013.01);
  (Continued)

(58) Field of Classification Search
  CPC .... G01M 11/00; G01M 11/005; G01M 11/02; G01M 11/0207; G01M 11/0221; G01M 11/0235; G01M 11/0242; G01M 11/0257; G01M 11/0264; G01M 11/0271; G01B 9/02029; G01B 9/0203; G01B 9/02041;
  (Continued)

(56) References Cited

U.S. PATENT DOCUMENTS 7,307,708 B2 * 12/2007 Murata .............. G01M 11/0257
  356/127
7,944,552 B2 * 5/2011 Murata .............. G01M 11/0221
  356/124
(Continued)

FOREIGN PATENT DOCUMENTS

CN 112816188 A * 5/2021 ........ G01M 11/0207
JP 2002-213926 A 7/2002
(Continued)

OTHER PUBLICATIONS

Extended European Search Report issued by the European Patent Office on Jan. 23, 2024 in corresponding EP Patent Application No. 23195963.6.

*Primary Examiner* — Gordon J Stock, Jr.
(74) *Attorney, Agent, or Firm* — Carter, DeLuca & Farrell LLP

(57) ABSTRACT

An acquiring apparatus includes a first light source, a measurement optical system, an image sensor, an adjusting unit, an interferometer, and a calculating unit configured to calculate a distance between adjacent target surfaces among the plurality of target surfaces based on an interference signal. The index surface, a surface containing the first point, a surface containing the second point, and the light receiving surface have a conjugate relationship with each other with respect to the measurement optical system.

10 Claims, 8 Drawing Sheets

(51) Int. Cl.
*G01B 11/14* (2006.01)
*G01M 11/02* (2006.01)

(52) U.S. Cl.
CPC .... *G01M 11/0207* (2013.01); *G01M 11/0221* (2013.01); *G01M 11/0271* (2013.01)

(58) Field of Classification Search
CPC .............. G01B 9/02042; G01B 9/0209; G01B 9/02017; G01B 9/02021; G01B 9/02062; G01B 9/02063; G01B 9/02067; G01B 9/02068; G01B 9/02025; G01B 11/14
See application file for complete search history.

(56) References Cited

U.S. PATENT DOCUMENTS

| | | | |
|---|---|---|---|
| 8,760,666 B2 * | 6/2014 | Heinisch | G01M 11/0221 356/505 |
| 8,913,234 B2 * | 12/2014 | Heinisch | G01M 11/0221 356/73 |
| 10,969,299 B2 * | 4/2021 | Liu | G01M 11/0228 |
| 11,659,991 B2 * | 5/2023 | Lubatschowski | G01B 9/02091 351/206 |
| 11,662,199 B2 * | 5/2023 | Fresquet | G02B 21/0016 356/498 |
| 11,808,656 B2 * | 11/2023 | Courteville | G01B 11/2441 |
| 12,359,910 B2 * | 7/2025 | Petitgrand | G01B 11/2441 |
| 2005/0128468 A1 | 6/2005 | Murata | |
| 2012/0133924 A1 | 5/2012 | Heinisch | |
| 2024/0240940 A1 * | 7/2024 | Kambara | G01B 9/02063 |
| 2025/0251301 A1 * | 8/2025 | Sugimoto | G01B 9/0209 |

FOREIGN PATENT DOCUMENTS

| | | | |
|---|---|---|---|
| JP | 2003098034 A | * | 4/2003 |
| JP | 2005-147703 A | | 6/2005 |
| JP | 2012-118066 A | | 6/2012 |
| WO | 2020/245511 A1 | | 12/2020 |

* cited by examiner

ACQUIRING APPARATUS, ACQUIRING METHOD, AND OPTICAL SYSTEM MANUFACTURING METHOD

BACKGROUND

Technical Field

One of the aspects of the embodiments relates to an acquiring apparatus configured to acquire a distance (interval) between target surfaces (surfaces to be detected or measured) in an optical system.

Description of Related Art

In an optical system including a plurality of optical elements, the arrangement accuracy of each optical element affects the optical performance. In order to check whether each optical element is disposed at a desired position, a technology for measuring a surface distance between the optical elements has been developed.

Japanese Patent Laid-Open No. 2005-147703 discloses an apparatus that includes an adjusting unit configured to make an adjustment such that the optimum reference axis of a target optical system (or optical system to be detected or measured) calculated from a positional shift of a reflecting spot of each target surface coincides with a predetermined measurement reference axis, and to measure a surface distance. Japanese Patent Laid-Open No. 2012-118066 discloses an apparatus that temporarily determines an optical axis of a target optical system from a position of a center of curvature of each target surface measured by an optical angle measuring device or a position of light that has transmitted through the target optical system, places the target optical system so that its optical axis and a reference axis are aligned with each other, and measures the position of each target surface.

However, each of the measuring apparatuses disclosed in Japanese Patent Laid-Open Nos. 2005-147703 and 2012-118066 cannot obtain a signal from the target surface if the target surface has a large eccentricity amount in the surface distance measurement and the center of curvature position measurement.

SUMMARY

An acquiring apparatus according to one aspect of the embodiment includes a first light source configured to illuminate a chart including an index surface on which an index is provided, a measurement optical system including an objective lens and configured to cause index light emitted from the chart to enter a target optical system, an image sensor configured to receive the index light reflected by a plurality of target surfaces in the target optical system via the measurement optical system, an adjusting unit configured to adjust a relative position between the objective lens and the target optical system so as to image the chart by the index light at a reference position on a light receiving surface of the image sensor, an interferometer including a second light source, and configured to divide light from the second light source into target light and reference light, and to acquire an interference signal by causing the reference light and the target light that has been emitted from a first point, reflected on the plurality of target surfaces, and incident on a second point via the measurement optical system to interfere with each other, and a calculating unit configured to calculate a distance between adjacent target surfaces among the plurality of target surfaces based on the interference signal. The index surface, a surface containing the first point, a surface containing the second point, and the light receiving surface have a conjugate relationship with each other with respect to the measurement optical system. An acquiring method corresponding to the acquiring apparatus also constitutes another aspect of the embodiment. A manufacturing method of an optical system using the above acquiring method also constitutes another aspect of the embodiment.

Further features of the disclosure will become apparent from the following description of embodiments with reference to the attached drawings.

DESCRIPTION OF THE EMBODIMENTS

Figure 1:
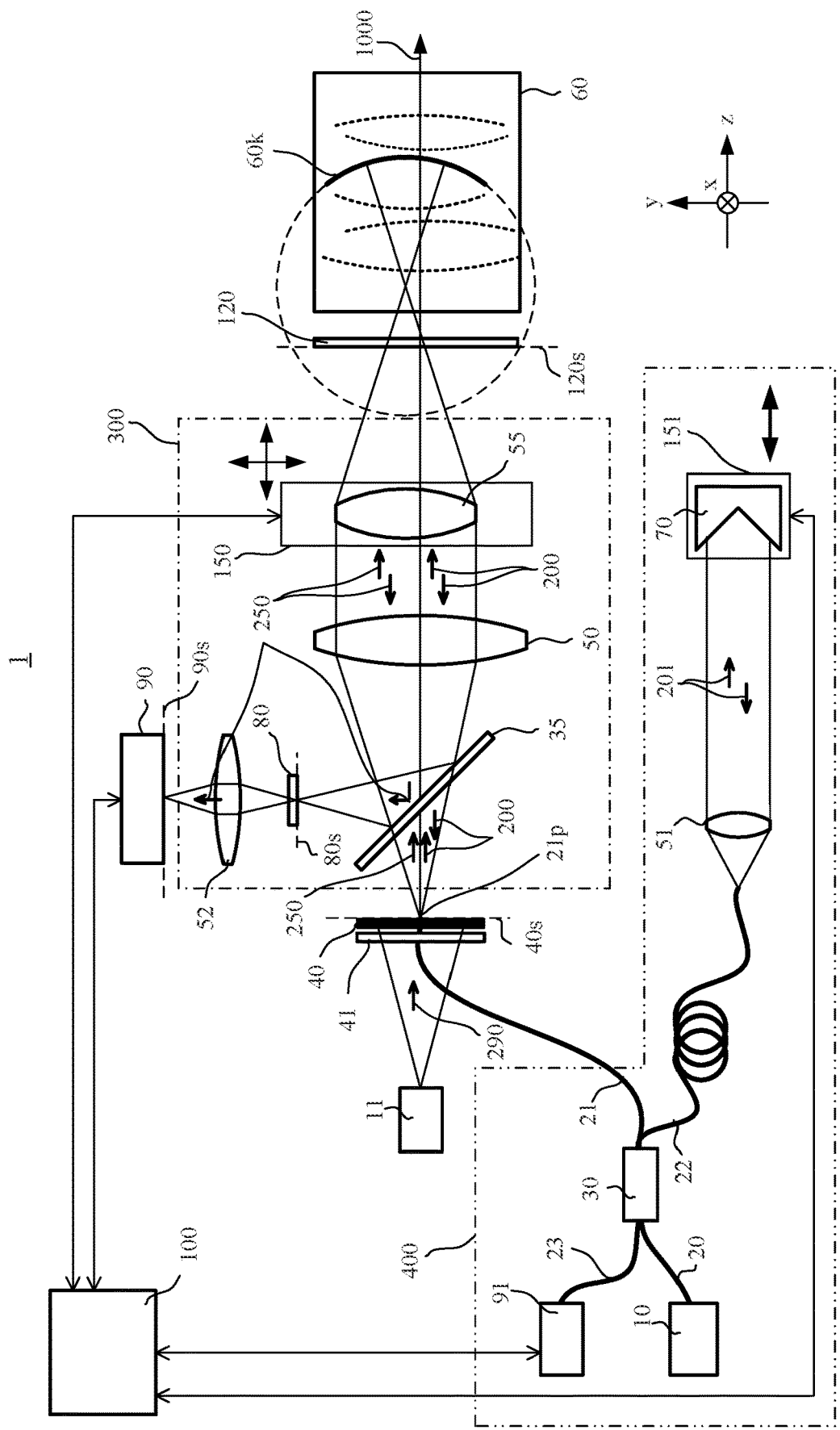
FIG. 1 illustrates a configuration of a surface distance measuring apparatus according to a first embodiment.

Referring now to the accompanying drawings, a detailed description will be given of embodiments according to the disclosure. Corresponding elements in respective figures will be designated by the same reference numerals, and a duplicate description thereof will be omitted.

First Embodiment

FIG. 1 illustrates a configuration of a surface distance measuring apparatus (acquiring apparatus) 1 according to a first embodiment. The surface distance measuring apparatus 1 includes an illumination light source (first light source) 11, an index chart 40, a measurement optical system 300, an image sensor 90, a stage (adjusting unit) 150, an interferometer 400, and a computer (calculating unit) 100. A target optical system (optical system to be detected or measured) 60 is an optical system including a plurality of lenses. The surface distance measuring apparatus 1 measures (acquires) a distance between a plurality of target surfaces (number of surfaces: N) of the target optical system 60. A reference plate 120 is disposed between the measurement optical system 300 and the target optical system 60.

The measurement optical system 300 includes a beam splitter 35, a collimator lens 50, an objective lens 55, an imaging plane chart 80, and an imaging lens 52. The beam splitter 35 includes, for example, a pellicle beam splitter. A measurement axis 1000 as an optical axis of the measurement optical system 300 is parallel to the Z-axis in FIG. 1, and approximately accords with the optical axis of the measurement optical system 300. The objective lens 55 is a lens disposed in the measurement optical system 300 at a position closest to the target optical system 60.

Figures 2A, 2B, 2C, 2D, 2E:
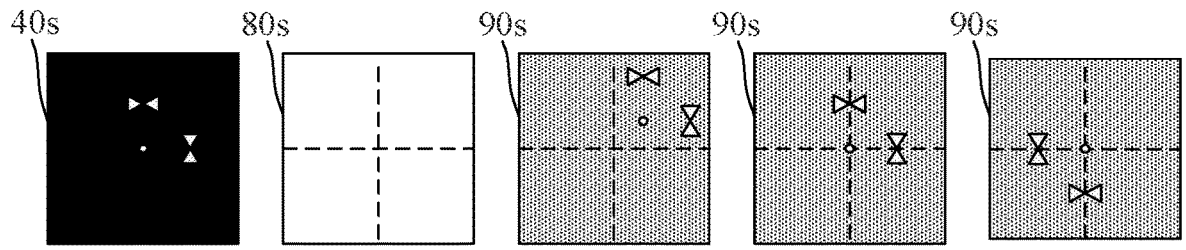
FIGS. 2A, 2B, 2C, 2D, and 2E illustrate an index chart, an imaging plane chart, and an image captured by an image sensor in the first embodiment.

Illumination light 290 emitted from the illumination light source 11 (e.g., halogen lamp or LED) is diffused by a diffuser plate 41 and illuminates a transmission type index chart 40. FIG. 2A is a schematic diagram of the index chart 40 in this embodiment. The index chart 40 includes an index surface on which indices are provided. A white portion in FIG. 2A indicates an area through which light is transmitted. A surface 40s of the index chart 40 in FIG. 1 is perpendicular to the measurement axis 1000 (that is, parallel to the XY plane of FIG. 1), and a white dot (circle) portion at the center of FIG. 2A is located on the measurement axis 1000. The surface 40s is an index surface provided with the index. Assume that the position of the white dot portion from which a light ray propagating on the measurement axis 1000 is emitted is set to the origin of the index chart 40, a pattern (white triangle portion) formed on the index chart 40 is asymmetric with respect to the origin.

The index chart 40 emits divergent light (index light) 250 from the surface 40s of the index chart 40, and the index light 250 enters the measurement optical system 300. Since the patterns formed on the index chart 40 (the white dot portion and the white triangle portion in FIG. 2A) are close to each other (for example, at a distance of 1 mm or less), they are drawn like light diverging from one point in FIG. 1.

The index light 250 incident on the measurement optical system 300 transmits through the beam splitter 35, passes through the collimator lens 50 to become parallel light, is condensed by the objective lens 55, transmits through the reference plate 120, and enters the target optical system 60. The objective lens 55 is installed on the stage 150 is movable in each of the X, Y, and Z directions, and can adjust the position of an image (real image or virtual image) of the index chart 40 formed by the index light 250. The position of stage 150 is managed by the computer 100.

Assume that a position (X, Y, Z) of the origin image of the index chart 40 formed by the index light 250 coincides with a position (Xc, Yc, Zc) of an apparent center of curvature of a k-th (k=1, 2, . . . , N) target surface 60k (measurement target surface) in the target optical system 60. In this case, the index light 250 is reflected by the measurement target surface 60k and travels back along substantially the same optical path as the incident optical path. That is, the index light 250 reflected by the measurement target surface 60k transmits through the reference plate 120, the objective lens 55, and the collimator lens 50, and reaches the beam splitter 35. Part of the index light 250 is reflected by the beam splitter 35, and the index chart 40 is imaged on the surface 80s of the imaging plane chart 80. An image on the surface 80s of the imaging plane chart 80 is formed on the light receiving surface 90s of the image sensor 90 via the imaging lens 52. An image captured by the image sensor 90 is sent to the computer 100.

The index light 250 reflected by a target surface other than the measurement target surface 60k also reaches the image sensor 90. However, most of this index light 250 is shielded by the measurement optical system 300, is not imaged on the surface 90s of the image sensor 90, and thus is negligible.

A reference line (dashed line) as illustrated in FIG. 2B is drawn on the imaging plane chart 80. Therefore, the image sensor 90 simultaneously captures the image of the index chart 40 and the image of the reference line. FIG. 2C illustrates an example of an image captured by the image sensor 90 in a case where the position (X, Y, Z) of the origin image of the index chart 40 and the position (Xc, Yc, Zc) of the apparent center of curvature of the measurement target surface 60k have a relationship of X≠Xc, Y≠Yc, and Z=Zc. FIG. 2D illustrates an example of an image captured by the image sensor 90 in a case where X=Xc, Y=Yc, and Z=Zc. FIG. 2D is the same image as that observed in a case where a plane mirror is placed between the collimator lens 50 and the objective lens 55 so as to be parallel to the XY plane, and the index light 250 is reflected by the plane mirror, and the image position at the time is set to the reference position. For better understanding, FIGS. 2C and 2D illustrate images oriented to the same pattern arrangement in FIG. 2A in the vertical and horizontal directions. In practice, images inversely oriented in the up, down, left, and right directions can be obtained depending on the up, down, left, and right directions of the light receiving surface 90s of the image sensor 90 and the signal processing in the computer 100.

The interferometer 400 includes a low-coherence light source (second light source) 10, fibers 20, 21, 22, and 23, a fiber coupler 30, a collimator lens 51, a mirror 70 (such as a retroreflector), a detector 91, and a stage (optical path length changing unit, reference stage) 151. The interferometer 400 according to this embodiment is a Michelson interferometer. The low-coherence light source 10 is a broadband light source such as a Super Luminescent Diode (SLD) light source or an Amplified Spontaneous Emission (ASE) light source. Light from the low-coherence light source 10 passes through the fiber 20 and is split (divided) into target light 200 and reference light 201 at the fiber coupler 30. The reference light exits through fiber 22. The target light passes through the fiber 21 and diverges from a point on the same plane as the surface 40s of the index chart 40 (the white dot portion in FIG. 2A in this embodiment). The diffuser plate 41 and the index chart 40 have holes for passing the fiber 21, and a fiber end 21p of the fiber 21 is disposed on the surface 40s of the index chart 40.

The target light 200 emitted from the fiber end (exit or emitting point (first point)) 21p of the fiber 21 enters the measurement optical system 300. The target light 200 transmits through the beam splitter 35, becomes parallel light by the collimator lens 50, is condensed by the objective lens 55, transmits through the reference plate 120, and enters the target optical system 60.

Similarly to the index light 250, in a case where the position of the condensing point of the target light 200 (real image or virtual image of the fiber end 21p) coincides with the position of the apparent center of curvature of the measurement target surface 60k, the target light 200 reflected by the measurement target surface 60k travels backward along the same optical path as the incident optical path. That is, the target light 200 reflected by the measurement target surface 60k transmits through the reference plate 120, the objective lens 55, the collimator lens 50, and the beam splitter 35, and returns to the fiber end (incident point (second point)) 21p. In this embodiment, the exit point and the incident point of the target light 200 are the same.

In this embodiment, the position of the origin image of the index chart 40 formed by the index light 250 and the position of the image of the fiber end 21p formed by the target light 200 match. That is, each of the surface 40s of the index chart, the surface including the fiber end (exit point and incident point) 21p (the same surface as the surface 40s of the index chart in this embodiment), and the light receiving surface 90s of the image sensor have a conjugate relationship with each other with respect to the measurement optical system 300. In this embodiment, they have also a conjugate relationship with the surface 80s of the imaging plane chart.

Part of the target light 200 reflected by a target surface other than the measurement target surface 60k returns to the incident point 21p. However, most of this target light 200 is shielded by the measurement optical system 300 and is not condensed at the incident point 21p, so a light amount returning to the incident point 21p is very small. In addition to the target surface, the target light 200 is reflected by the surface (optical path length reference surface) 120s of the reference plate 120 and returns to the incident point 21p. Since the optical path length reference surface 120s is not coated with an antireflection film and is flat, a light amount of the target light 200 reflected by the optical path length reference surface 120s returns to the incident point 21p to some extent.

The target light 200 that has returned to the fiber end 21p passes through the fiber 21 again and reaches the fiber coupler 30. The reference light 201 emitted from the fiber 22 becomes parallel light by the collimator lens 51, is reflected by the mirror 70, passes through the collimator lens 51 and the fiber 22 again, and reaches the fiber coupler 30. The target light 200 and the reference light 201 interfere with each other at the fiber coupler 30, the interference light passes through the fiber 23 and is received by a detector (for example, a photodiode) 91 and its signal is sent to the computer 100.

The mirror 70 is installed on the reference stage 151 that is movable in the arrow direction (Z direction) in FIG. 1, and the optical path length (reference optical path length) of the reference light 201 can be changed by moving the reference stage 151. The envelope of the interference signal has a maximum value when the optical path length of the target light 200 and the optical path length of the reference light 201 are equal to each other. Information on the position of the reference stage 151 (such as an output value of an encoder or a length measuring device (not illustrated)) is sent to the computer 100.

The computer 100 calculates the optical path length of the measurement target surface 60k based on the interference signal. The optical path length of each target surface is calculated by sequentially changing the measurement target surface 60k (k=1, 2, . . . , N), and the surface distance of the target optical system 60 is calculated.

Figure 3:
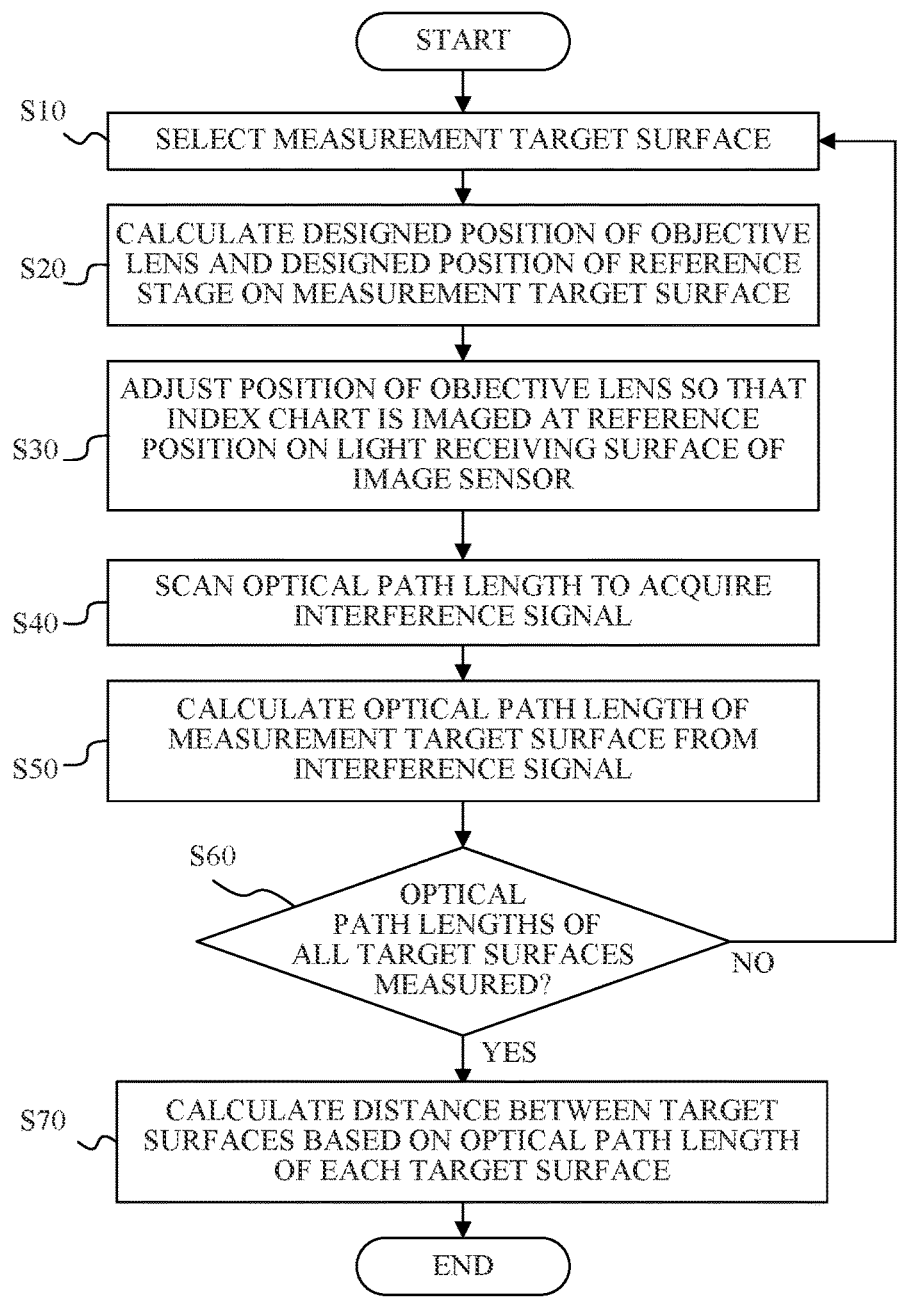
FIG. 3 is a flowchart illustrating a measurement procedure of a surface distance in a target optical system according to the first embodiment.

FIG. 3 is a flowchart illustrating the procedure for measuring a surface distance (acquiring procedure) in the target optical system 60 according to the first embodiment.

First, in step S10, the measurement target surface 60k (k-th target surface) is selected from a plurality of target surfaces (number of surfaces: N). The measurement target surface 60k may be selected in order from the first surface to the N-th surface of the target optical system 60 (in order of optical path length) or may be selected in order of distance from the center of curvature position. The measurement target surface 60k may be selected in the order of the position where the objective lens 55 is installed for each target surface, or may be selected at random.

Next, in step S20, the designed position of the objective lens 55 and the designed position of the reference stage 151 on the measurement target surface 60k are calculated. The designed position of the objective lens 55 is X, Y, and Z positions (calculated values) of the objective lens 55 in a case where the position of the origin image of the index chart 40 coincides with the apparent center of curvature of the measurement target surface 60k. This value is calculated by paraxial calculation or ray tracing using the designed value of the target optical system 60. The designed position of the reference stage 151 is a position of the reference stage 151 in a case where the optical path length of the target light 200 reflected by the measurement target surface 60k and the optical path length of the reference light 201 are equal each other, and it is calculated from the designed value of the target optical system 60.

Then, in step S30, the position of the objective lens 55 is adjusted using the stage 150 so that the index chart 40 is imaged at the reference position on the light receiving surface 90s of the image sensor 90. In this step, first, the objective lens 55 is disposed near the designed position, and the position of the objective lens 55 in the Z direction is adjusted so that the index chart 40 is imaged on the light receiving surface 90s of the image sensor 90. In a case where the image is out of the field of view of the image sensor 90, the objective lens 55 is also adjusted in the X and Y directions. At this time, in a case where the measurement target surface 60k is decentered, an image of the index chart that is shifted from the reference position is observed as illustrated in FIG. 2C. Accordingly, the X and Y positions of the objective lens 55 are adjusted so that the image observed by the image sensor 90 is formed at the reference position (as illustrated in FIG. 2D).

Next, in step S40, the reference stage 151 scans the reference optical path length to acquire an interference signal. The interference signal may be obtained by moving the reference stage 151 over the entire drivable range, but moving the reference stage 151 only near the designed position can reduce the measurement time.

Then, in step S50, the optical path length of the measurement target surface 60k is calculated based on the position of the reference stage 151 when the envelope of the interference signal has a maximum value. Since the target light 200 reflected by a target surface other than the measurement target surface 60k also returns to the fiber end 21p, there are multiple locations where the envelope of the interference signal has a maximum value. To specify which is the maximum value of the measurement target surface 60k, the information about the designed position of the reference stage 151 calculated in step S20 is used. The maximum value near the designed position is the maximum value of the measurement target surface 60k. Alternatively, since the target light 200 reflected by the measurement target surface 60k is condensed at the incident point 21p, it has a higher intensity than that of the target light 200 reflected by another target surface. Accordingly, it may be determined that a large maximum value corresponds to the maximum value of the measurement target surface 60k.

Then, in step S60, it is checked whether the optical path lengths of all target surfaces have been measured (acquired) (total number of surfaces=N). If the measurement has been completed, the flow proceeds to step S70; otherwise, the flow returns to step S10.

Finally, in step S70, a distance between target surfaces is calculated based on the optical path length of each target surface. In this step, first, the value of the optical path length of each adjacent target surface and the refractive index information between the target surfaces are extracted. Information on the refractive index may be the designed value of the target optical system 60. Then, the optical path length difference is calculated from the optical path length of the adjacent target surfaces, and a group refractive index $N_g(\lambda_0)$ is also calculated separately from the refractive index information and a center wavelength $\lambda_0$ of the low-coherence light source 10. The group refractive index can be calculated using the following equation (1):

$$N_g(\lambda_0) = N_p(\lambda_0) - \lambda_0(dN_p(\lambda_0)/d\lambda) \quad (1)$$

where $N_p(\lambda_0)$ is a phase refractive index at wavelength $\lambda_0$, and $\lambda$ is a wavelength. The surface distance can be calculated by dividing the calculated optical path length difference by the group refractive index. In a case where the target surface interval is air, the division of the group refractive index may be omitted and the optical path length difference itself may be used as the surface distance. This calculation is performed between all target surfaces. Thus, the measurement flow is completed.

Normally, in a case where the target surface is significantly decentered (such as 0.1 mm to 1 mm), the light reflected by the target surface does not return to the incident point 21p and the optical path length cannot be measured. In this embodiment, each of the surface 40s of the index chart 40, the surface including the exit point 21p, the surface including the incident point 21p, and the light receiving surface 90s of the image sensor 90 have a conjugate relationship with each other. Based on this relationship, the objective lens 55 and the target optical system 60 are moved relative to each other so that the index chart 40 is imaged at the reference position (in this embodiment, the target optical system 60 is fixed and only the objective lens 55 is moved). Under this condition, the target light 200 reflected by the measurement target surface 60k inevitably returns to the incident point 21p. Therefore, the optical path length of each target surface can be reliably measured, and a surface distance in the target optical system 60 having a target surface with a large eccentricity amount can also be measured.

This embodiment uses the index chart 40 with an asymmetrical pattern with respect to the origin as illustrated in FIG. 2A. This is to distinguish whether the position of the origin image of the index chart 40 formed by the index light 250 is at the center of curvature of the measurement target surface 60k or on the surface of the measurement target surface 60k. If the pattern of the index chart 40 is symmetrical with respect to the origin, an image obtained when the image of the index chart 40 is formed at the center of curvature position of the measurement target surface 60k and an image obtained when the image of the index chart 40 is formed at the surface position of the measurement target surface 60k are equally observed and cannot be distinguished. On the other hand, in a case where the index chart 40 with an asymmetrical pattern as in this embodiment is used, in a case where the image of the index chart 40 is formed at the surface position of the measurement target surface 60k, an image illustrated in FIG. 2E is observed (which corresponds to the image of the index chart 40 inverted with respect to the origin in comparison with FIG. 2D). In step S30, in a case where the objective lens 55 is disposed near the designed position, the target light 200 may converge on the surface of another target surface, and a plurality of images of the index chart 40 may be observed on the image sensor 90. At that time, a pattern asymmetrical with respect to the origin as in this embodiment is effective.

This embodiment uses for the index chart 40 a chart having a shape as illustrated in FIG. 2A, but any shape may be used as long as it is an asymmetrical pattern with respect to the origin. For example, instead of a triangle, a cross, a circle, a square, etc. may be disposed.

This embodiment repeats the measurement of the optical path length for each measurement target surface 60k, and thus it takes time to measure the overall optical path length. Therefore, thermal expansion in the fibers 20, 21, 22, and 23 and the measurement optical system 300, drifts of optical elements, and the like that occur during the measurement may not be negligible. In that case, in obtaining the interference signal of each target surface, the interference signal (reference interference signal) of the optical path length reference surface 120s may be simultaneously measured. The optical path length (reference optical path length) of the optical path length reference surface 120s calculated from the reference interference signal is also affected by thermal expansion and drift. Using this reference optical path length, the influence of thermal expansion and drift of the optical element can be corrected from the optical path length of the measurement target surface 60k. This embodiment uses the optical path length reference surface 120s of the reference plate 120 as the optical path length reference surface, but in a case where the first surface of the target optical system 60 is nearly flat, the first surface can also be used as the optical path length reference surface.

In this embodiment, the index light 250 and the target light 200 are emitted from the same plane (40s). However, the points from which the index light 250 and the target light 200 are emitted do not have to be strictly on the same plane (the same Z coordinate). In a case where the index light 250 and the target light 200 have significantly different wavelengths, the positions of the index chart 40 and the fiber end 21p may be adjusted in consideration of chromatic aberration.

This embodiment places the objective lens 55 on the stage 150, and adjusts the relative positions of the objective lens 55 and the target optical system 60. Alternatively, the objective lens 55 may be fixed, the target optical system 60 may be placed on the stage, and the position of the target optical system 60 may be adjusted. Alternatively, both objective lens 55 and target optics 60 may have adjusting unit. Alternatively, the relative positions of the objective lens 55 and the target optical system 60 may be adjusted by disposing all of the index chart 40, the measurement optical system 300, and the image sensor 90 on the stage and moving their positions together.

Although this embodiment uses two light sources, i.e., the illumination light source 11 and the low-coherence light source 10, the illumination light source 11 may be replaced by the low-coherence light source 10. For example, the illumination light source 11 can be removed by guiding part of the light from the low-coherence light source 10 to the illumination light source 11 using a fiber or the like.

This embodiment installs the diffuser plate 41 so that the index light 250 emitted from the index chart 40 diverges in various directions, but the diffuser plate 41 may be removed because the light is diffracted at the edge of the light transmitting portion of the index chart 40 (white triangle portion in FIG. 2A in this embodiment).

This embodiment uses a chart having reference lines as illustrated in FIG. 2B as the imaging plane chart 80, but may use a chart of any shape. Alternatively, the imaging plane chart 80 may be removed. The reference line may be drawn directly on a display unit that displays the image obtained by the image sensor 90, or may be overlaid on the image data.

This embodiment uses a pellicle beam splitter as the beam splitter 35, but may use a cube beam splitter or a half-mirror.

This embodiment captures an image of the index chart 40 formed on the surface 80s of the imaging plane chart 80 using the image sensor 90 via the imaging lens 52. Alternatively, the imaging plane chart 80 and the imaging lens 52 may be removed, and the image sensor 90 may be disposed at the position of the imaging plane chart 80.

This embodiment uses the principle of Time Domain-Optical Coherence Tomography (TD-OCT) that drives the stage 151 in measuring the optical path length. Alternatively, this embodiment may install a Spectral Domain (SD)-OCT in which the detector 91 is replaced with a spectroscope, or a Swept Source (SS)-OCT in which the light source 10 is replaced with a wavelength swept light source. However, each of SD-OCT and SS-OCT usually has a measurable range in the depth direction smaller than that in TD-OCT (because it depends on wavelength resolution). Therefore, in using the principle of SD-OCT or SS-OCT in this embodiment, it is used in combination with movement of the position of the mirror 70 or movement of the position of the target optical system 60.

Second Embodiment

Figure 4:
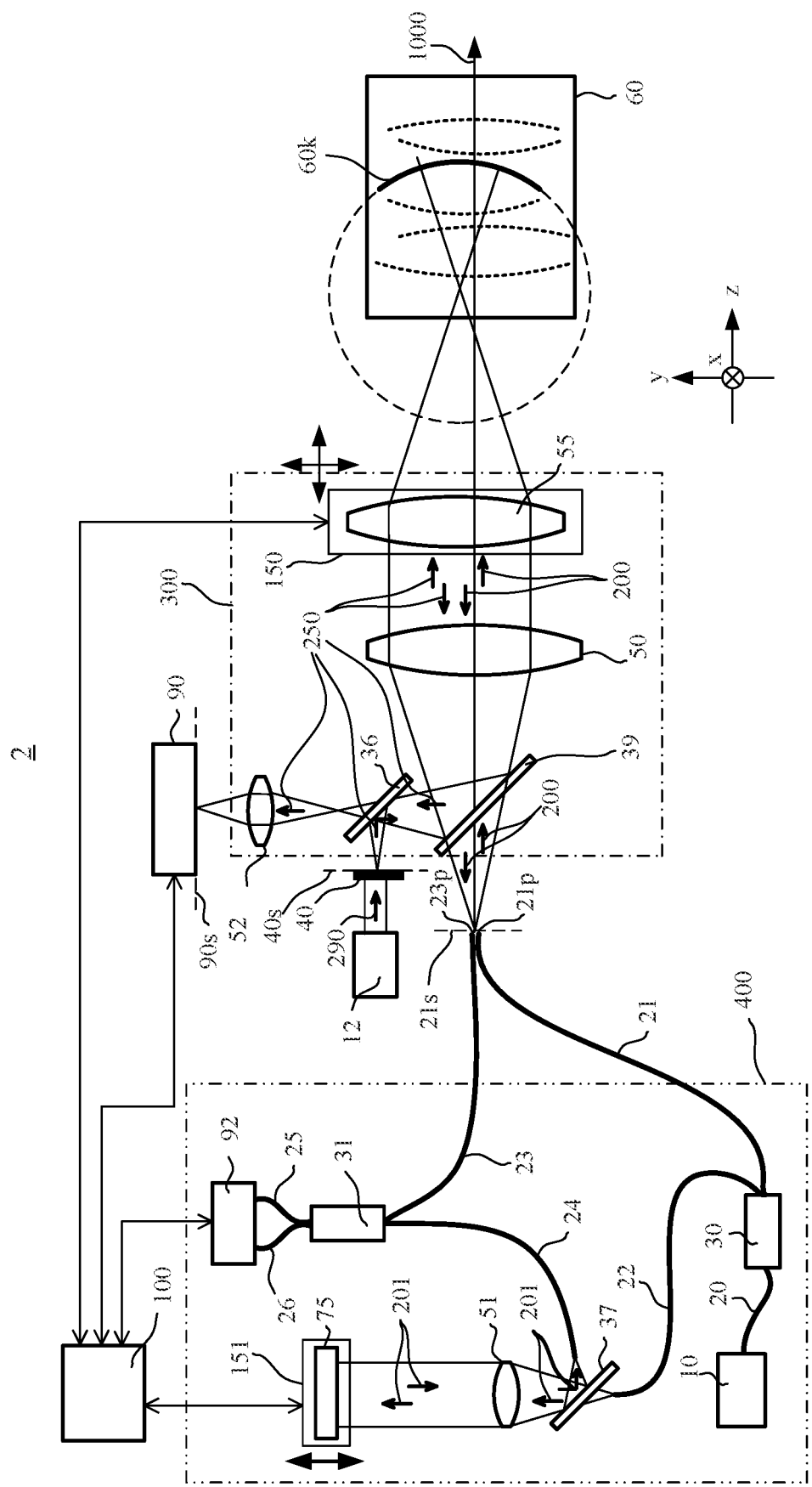
FIG. 4 illustrates a configuration of a surface distance measuring apparatus according to a second embodiment.

FIG. 4 illustrates a configuration of a surface distance measuring apparatus 2 according to a second embodiment. The surface distance measuring apparatus 2 includes an illumination light source 12, an index chart 40, a measurement optical system 300, an image sensor 90, a stage (adjusting unit) 150, an interferometer 400, and a computer (calculating unit) 100. The measurement optical system 300 includes beam splitters 36 and 39, a collimator lens 50, an objective lens 55, and an imaging lens 52. The beam splitter 39 is, for example, a dichroic mirror. The interferometer 400 includes a low-coherence light source 10, fibers 20 to 26, fiber couplers 30 and 31, a beam splitter 37, a collimator lens 51, a mirror 75, a differential detector 92, and a stage (optical path length changing unit, reference stage) 151. The interferometer 400 according to this embodiment is a Mach-Zehnder interferometer. Mirror 75 is, for example, a plane mirror.

Figure 5A:
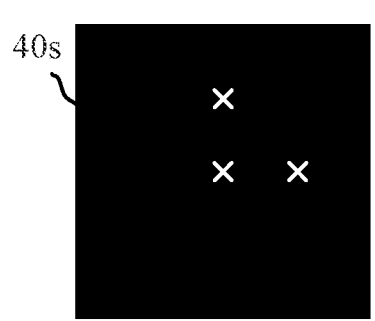
FIGS. 5A, 5B, and 5C illustrate an index chart, a positional relationship among an exit point, an incident point, and a measurement axis, and an image captured by an image sensor in the second embodiment.

The light 290 emitted from the illumination light source 12 (e.g., semiconductor laser) illuminates the index chart 40. FIG. 5A is a schematic diagram of the index chart 40 according to this embodiment. The index chart 40 emits divergent light (index light) 250 from the surface 40s of the index chart 40, and the index light 250 enters the measurement optical system 300. Since patterns (white cross portions in FIG. 5A) formed on the index chart 40 are close to each other, they are drawn as if they were diverging from one point in FIG. 4.

The index light 250 that has entered the measurement optical system 300 is reflected by the beam splitters 36 and 39, passes through the collimator lens 50 to become parallel light, is condensed by the objective lens 55, and enters the target optical system 60. The objective lens 55 is installed on a stage 150 that is movable in each of the X, Y, and Z directions so as to adjust the position of the image of the index chart 40. The position of stage 150 is managed by computer 100.

Assume that the origin of the index chart 40 is set to a point at which a light ray propagating on the measurement axis 1000 out of the index light 250 is emitted. At this time, in a case where the position of the origin image of the index chart 40 coincides with the center of curvature of the measurement target surface 60k of the target optical system 60, the index light 250 is reflected by the measurement target surface 60k and travels back along substantially the same optical path as the incident light path. The index light 250 reflected by the measurement target surface 60k is imaged on the light receiving surface 90s of the image sensor 90 through the objective lens 55, the collimator lens 50, the beam splitters 39 and 36, and the imaging lens 52. An image captured by the image sensor 90 is sent to the computer 100.

Light from the low-coherence light source 10 passes through the fiber 20 and is split (divided) into the target light 200 and the reference light 201 at the fiber coupler 30. The reference light 201 is emitted through the fiber 22. The target light 200 passes through the fiber 21 and diverges and is emitted from the fiber end (exit point) 21p. The target light 200 emitted from the exit point 21p enters the measurement optical system 300. The target light 200 passes through the beam splitter 39, becomes parallel light by the collimator lens 50, is condensed by the objective lens 55, and enters the target optical system 60.

Similarly to the index light 250, in a case where the position of the real image or virtual image of the fiber end 21p formed by the target light 200 substantially coincides with the center of curvature of the measurement target surface 60k, the target light 200 is reflected on the measurement target surface 60k travels back along substantially the same optical path as the incident optical path. The target light 200 reflected by the measurement target surface 60k transmits through the objective lens 55, the collimator lens 50, and the beam splitter 39, and enters the fiber end (incident point) 23p of the fiber 23.

Figure 5B:
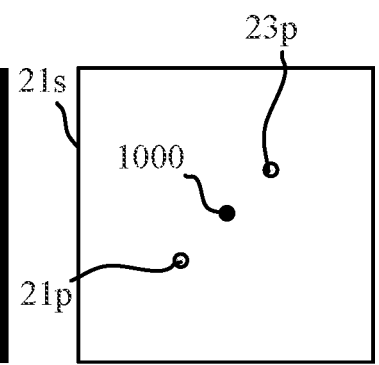
Figure 5C:
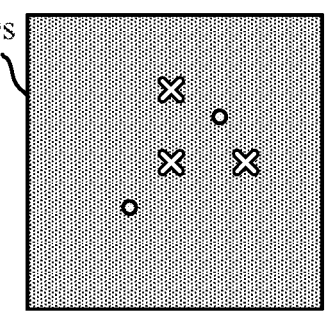

FIG. 5B illustrates a positional relationship among the exit point 21p, the incident point 23p, and the measurement axis 1000 on the surface 21s. In the first embodiment, the exit point (emitting point) and the incident point are located at the same position and on the measurement axis 1000, but in this embodiment, they are located at symmetrical positions with respect to the measurement axis 1000. FIG. 5C is an image captured by the image sensor 90 in a case where the index chart 40 is imaged at the reference position on the light receiving surface 90s of the image sensor 90. A white dot (circle) indicates an image of the exit point 21p and an image of the incident point 23p.

The target light 200 returned to the fiber end 23p reaches the fiber coupler 31 through the fiber 23. The reference light 201 emitted from the fiber 22 passes through the beam splitter 37, becomes parallel light by the collimator lens 51, is reflected by the mirror 75, passes through the collimator lens 51 again, is reflected by the beam splitter 37, and enters the fiber 24. The reference light 201 incident on the fiber 24 reaches the fiber coupler 31 through the fiber 24. The target light 200 and the reference light 201 interfere with each other at the fiber coupler 31, the interference light passes through the fibers 25 and 26 and is received by the differential detector (balance detector) 92, and its signal is sent to the computer 100.

The mirror 75 is installed on a reference stage 151 that is movable in the arrow direction (Y direction) in FIG. 4, and the optical path length of the reference light 201 can be changed by moving the reference stage 151. Information on the position of the reference stage 151 is sent to the computer 100.

The computer 100 calculates the optical path length of the measurement target surface 60k based on the interference signal. While sequentially changing the measurement target surface 60k, the computer 100 calculates the optical path length of each target surface, and a distance between the target surfaces.

In this embodiment, each of the surface 40s of the index chart 40, the surface 21s including the exit point 21p, the surface 21s including the incident point 23p, and the light receiving surface 90s of the image sensor 90 have a conjugate relationship to each other with respect to the measurement optical system 300. Based on this relationship, in a case where the position of the objective lens 55 is adjusted so that the index chart 40 is imaged at the reference position as illustrated in FIG. 23p. That is, even if the measurement target surface 60k has a large eccentricity, the optical path length of the measurement target surface 60k can be measured.

Third Embodiment

Figure 6:
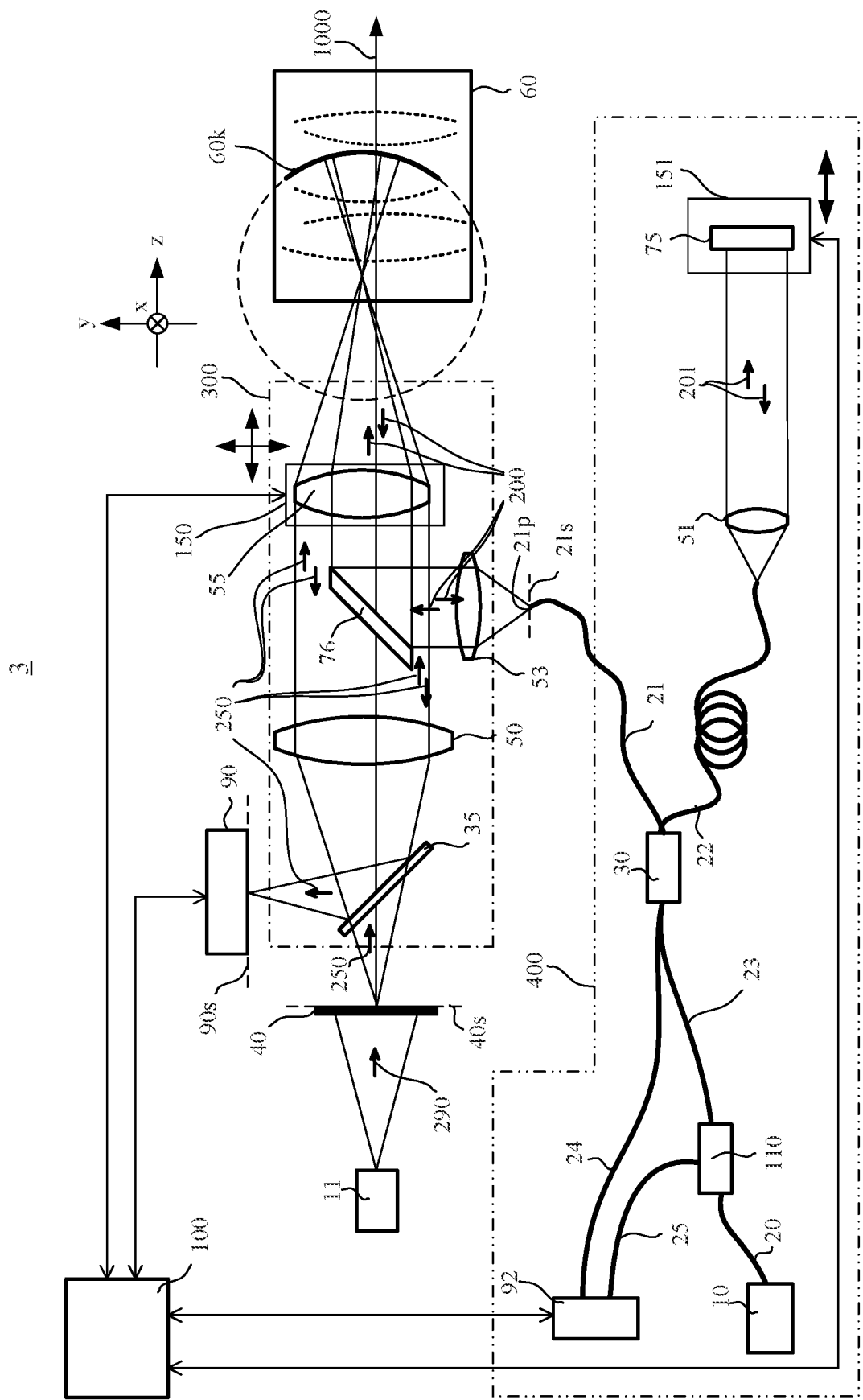
FIG. 6 illustrates a configuration of a surface distance measuring apparatus according to a third embodiment.

FIG. 6 illustrates a configuration of a surface distance measuring apparatus 3 according to a third embodiment. The surface distance measuring apparatus 3 includes an illumination light source 11, an index chart 40, a measurement optical system 300, an image sensor 90, a stage (adjusting unit) 150, an interferometer 400, and a computer (calculating unit) 100. The measurement optical system 300 includes a beam splitter 35, collimator lenses 50 and 53, an objective lens 55, and a mirror 76. The interferometer 400 includes a low-coherence light source 10, a circulator 110, fibers 20, 21, 22, 23, 24, and 25, a fiber coupler 30, a collimator lens 51, a mirror 75, a differential detector 92, a stage (optical path length changing unit, reference stage) 151. The interferometer 400 according to this embodiment is a Michelson interferometer.

Light 290 emitted from the illumination light source 11 illuminates the index chart 40, emits divergent light (index light) 250 from a surface 40s of the index chart 40, and the index light 250 enters the measurement optical system 300. The index light 250 incident on the measurement optical system 300 passes through the beam splitter 35 and the collimator lens 50 to become parallel light. Of the index light 250, part of the light near the center of the light beam is shielded by the mirror 76, and part of the light near the periphery of the light beam is collected by the objective lens 55 and enters the target optical system 60. The objective lens 55 is installed on the stage 150 that is movable in the X, Y, and Z directions, respectively, and the position (X, Y, Z) of the origin image of the index chart 40 formed by the collecting point of the index light can be adjusted. The position of the stage 150 is managed by computer 100.

In a case where the position of the real or virtual image at the origin of the index chart 40 coincides with the center of curvature of the measurement target surface 60k of the target optical system 60, the index light 250 is reflected by the measurement target surface 60k and travels back along the optical path that is substantially the same optical path as the incident optical path. The index light 250 reflected by the measurement target surface 60k forms an image on the light receiving surface 90s of the image sensor 90 via the objective lens 55, collimator lens 50, and beam splitter 35. In this embodiment, there is no light beam center ray of the index light 250, and an image formed only by peripheral rays (an image of only high frequency components) is sufficient to form the image of the index chart 40. An image captured by the image sensor 90 is sent to the computer 100.

The light from the low-coherence light source 10 passes through the fiber 20, the circulator 110 and the fiber 23, and is split (divided) into the target light 200 and the reference light 201 at the fiber coupler 30. The reference light 201 is exited through fiber 22. The target light 200 passes through the fiber 21, diverges and is emitted from the fiber end (exit point) 21p. The target light 200 emitted from the exit point 21p enters the measurement optical system 300. The target light 200 becomes parallel light by the collimator lens 53, is reflected by the mirror 76, is condensed by the objective lens 55, and enters the target optical system 60.

Similarly to the index light 250, in a case where the position of the real image or virtual image of the exit point 21p formed by the target light 200 coincides with the center of curvature of the measurement target surface 60k, the target light 200 is reflected by the measurement target surface 60k and travels back along substantially the same optical path as the incident optical path. The target light 200 reflected by the measurement target surface 60k returns to the fiber end (incident point) 21p of the fiber 21 via the objective lens 55, the mirror 76, and the collimator lens 53.

The target light 200 returned to the fiber end 21p reaches the fiber coupler 30 through the fiber 21. The reference light 201 emitted from the fiber 22 becomes parallel light by the collimator lens 51, is reflected by the mirror 75, passes through the collimator lens 51 again, enters the fiber 22, passes through the fiber 22, and reaches the fiber coupler 30. The target light 200 and the reference light 201 interfere with each other at the fiber coupler 30, and one of the interference lights passes through the fiber 24 and reaches the differential detector (balance detector) 92. The other coherent light passes through fiber 23, circulator 110, and fiber 25 to reach the differential detector 92. The interference signal received by the differential detector 92 is sent to computer 100.

The mirror 75 is installed on the reference stage 151 that is movable in the arrow direction (Z direction) in FIG. 6, and the optical path length of the reference light 201 can be changed by moving the reference stage 151. Information on the position of the reference stage 151 is sent to the computer 100.

The computer 100 calculates the optical path length of the measurement target surface 60k based on the interference signal. While sequentially changing the measurement target surface 60k, the computer 100 calculates the optical path length of each target surface, and a distance between the target surfaces.

In this embodiment, each of the surface 40s of the index chart 40, the surface 21s including the fiber end 21p (exit point and incident point), and the light receiving surface 90s of the image sensor 90 have a conjugate relationship with respect to the measurement optical system 300. Based on this relationship, in a case where the objective lens 55 is adjusted so that the image of the index chart 40 comes to the reference position, the target light 200 emitted from the exit point 21p inevitably enters the incident point 21p. That is, even in a case where the measurement target surface 60k has a large eccentricity, the optical path length of the measurement target surface 60k can be measured.

Fourth Embodiment

Figure 7:
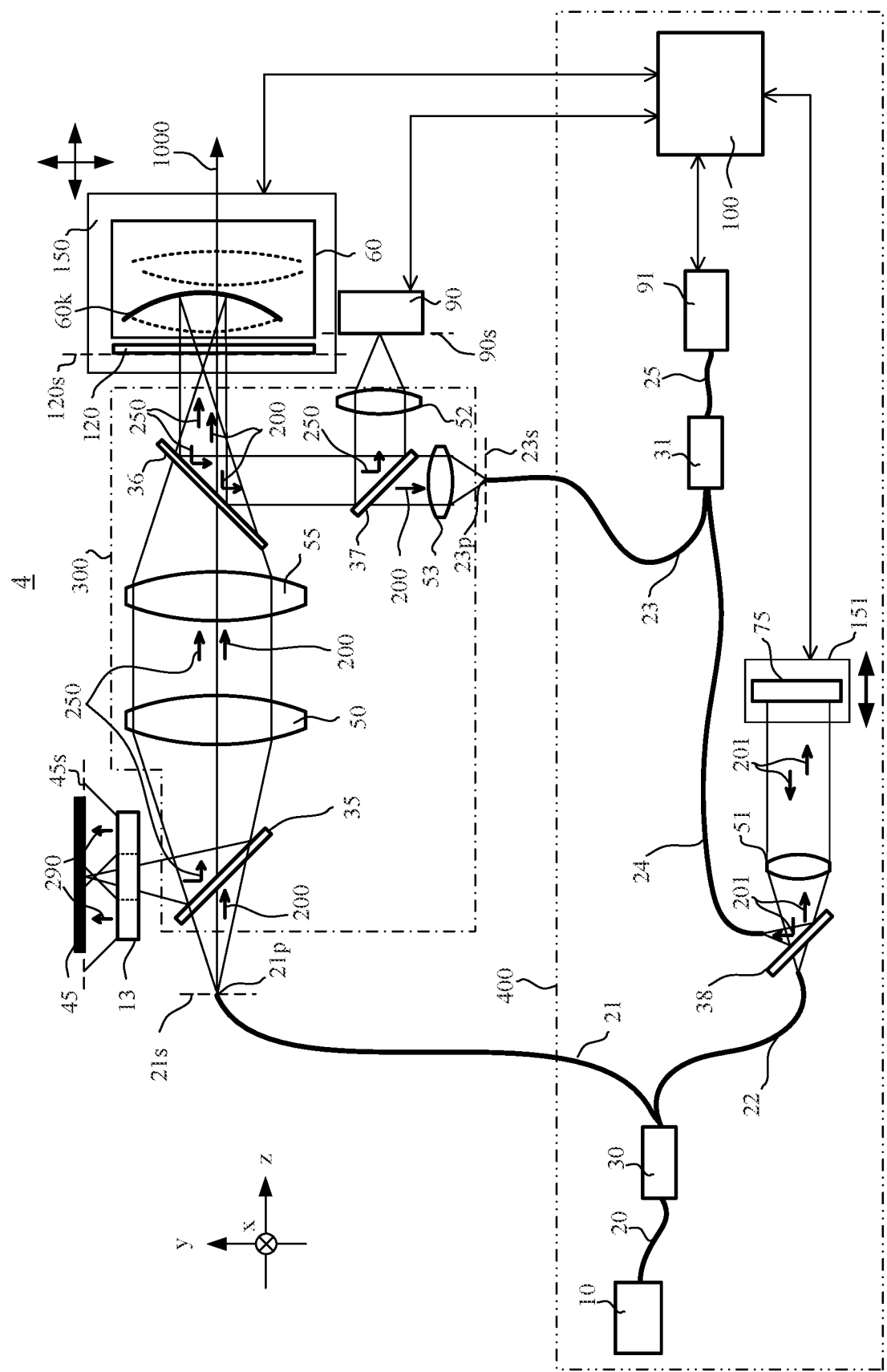
FIG. 7 illustrates a configuration of a surface distance measuring apparatus according to a fourth embodiment.

FIG. 7 illustrates a configuration of a surface distance measuring apparatus 4 according to a fourth embodiment. The surface distance measuring apparatus 4 includes an illumination light source 13, an index chart 45, a measurement optical system 300, an image sensor 90, a stage (adjusting unit) 150, an interferometer 400 and a computer (calculating unit) 100. The measurement optical system 300 includes beam splitters 35, 36, and 37, collimator lenses 50 and 53, an objective lens 55, and an imaging lens 52. The interferometer 400 includes a low-coherence light source 10, fibers 20, 21, 22, 23, 24, and 25, fiber couplers 30 and 31, a beam splitter 38, a collimator lens 51, a mirror 75, a detector 91, a stage (optical path length changing unit, reference stage) 151. The interferometer 400 according to this embodiment is a Mach-Zehnder interferometer.

Light 290 emitted from the illumination light source 13 (such as a hollow ring illumination LED) illuminates the reflection type index chart 45, divergent light (index light) 250 is emitted from the surface 45s of the index chart 45, and the index light 250 enters the measurement optical system 300. The index light 250 incident on the measurement optical system 300 is reflected by the beam splitter 35, passes through the collimator lens 50, and becomes parallel light. The index light 250 is condensed by the objective lens 55, passes through the beam splitter 36 and the reference plate 120, and enters the target optical system 60. The target optical system 60 and the reference plate 120 are installed on the stage 150 that is movable in the X, Y, and Z directions, respectively, so that the relative position of the target optical system 60 to the objective lens 55 can be adjusted. The position of stage 150 is managed by computer 100.

In a case where the virtual image of the origin of the index chart 45 is formed at the negative infinity position of the measurement axis 1000 by the index light 250 reflected by the measurement target surface 60$k$, the index light 250 becomes parallel light and is emitted from the target optical system 60. The index light 250 emitted from the target optical system 60 passes through the reference plate 120, is reflected by the beam splitters 36 and 37, and forms an image on the light receiving surface 90$s$ of the image sensor 90 via the imaging lens 52. An image captured by the image sensor 90 is sent to the computer 100.

The light from the low-coherence light source 10 passes through the fiber 20 and is split into target light 200 and reference light 201 at the fiber coupler 30. The reference light 201 is emitted through fiber 22. The target light 200 passes through the fiber 21 and diverges from the fiber end (exit point) 21$p$. The target light 200 emitted from the exit point 21$p$ enters the measurement optical system 300. The target light 200 becomes parallel light by the collimator lens 50, is condensed by the objective lens 55, transmits through the beam splitter 36, and the reference plate 120 and enters the target optical system 60.

Similarly to the index light 250, in a case where the virtual image of the fiber end (exit point) 21$p$ is formed at the negative infinity position of the measurement axis 1000 by the target light 200 reflected by the measurement target surface 60$k$, the target light 200 becomes parallel light and is emitted from the target optical system 60. The target light 200 emitted from the target optical system 60 transmits through the reference plate 120, is reflected by the beam splitter 36, transmits through the beam splitter 37, is condensed by the collimator lens 53, and enters the fiber end (incident point) 23$p$ of the fiber 23.

The target light 200 returned to the fiber end 23$p$ reaches the fiber coupler 31 through the fiber 23. The reference light 201 emitted from the fiber 22 passes through the beam splitter 38, becomes parallel light by the collimator lens 51, is reflected by the mirror 75, passes through the collimator lens 51 again, is reflected by the beam splitter 38, and is reflected by the fiber 24. The reference light 201 incident on the fiber 24 reaches the fiber coupler 31 through the fiber 24. The target light 200 and the reference light 201 interfere with each other at the fiber coupler 31, the interference light passes through the fiber 25 and is received by the detector 91, and its signal is sent to the computer 100.

The mirror 75 is installed on the reference stage 151 that is movable in the arrow direction (Z direction) in FIG. 7, and the optical path length of the reference light 201 can be changed by moving the reference stage 151. Information on the position of the reference stage 151 is sent to the computer 100.

The computer 100 calculates the optical path length of the measurement target surface 60$k$ based on the interference signal. While sequentially changing the measurement target surface 60$k$, the computer 100 calculates the optical path length of each target surface and a distance between the target surfaces.

In this embodiment, each of the surface 45$s$ of the index chart 45, the surface 21$s$ including the exit point 21$p$, the surface 23$s$ including the incident point 23$p$, and the light receiving surface 90$s$ of the image sensor 90 have a conjugate relationship with each other with respect to the measurement optical system 300. Based on this relationship, in a case where the target optical system 60 is adjusted so that the image of the index chart 45 comes to the reference position, the target light 200 emitted from the exit point 21$p$ inevitably enters the incident point 23$p$. That is, even if the measurement target surface 60$k$ has a large eccentricity, the optical path length of the measurement target surface 60$k$ can be measured.

This embodiment adjusts the relative positions between the objective lens 55 and the target optical system 60 by adjusting the position of the target optical system 60 instead of the objective lens 55. In a case where the position of the target optical system 60 is adjusted, the optical path length of the measurement target surface 60$k$ also changes according to the position of the target optical system 60. Accordingly, the reference optical path length of the target light 200 reflected by the optical path length reference surface 120$s$ of the reference plate 120 placed on the same stage 150 as the target optical system 60 may be used to correct the optical path length of the measurement target surface 60$k$. Calculating the optical path length of the measurement target surface 60$k$ with respect to the reference optical path length for each target surface can provide a surface distance measurement independent of the position of the target optical system 60.

This embodiment adjusts the position of the target optical system 60 so that the index light 250 and the target light 200 reflected by the measurement target surface 60$k$ are emitted as parallel light from the target optical system 60. However, the exit light is not limited to parallel light, and may be convergent light or divergent light. A converging image point or an imaginary point of a diverging origination is fixed, and the positions of the imaging lens 52 and the image sensor 90 and the positions of the collimator lens 53 and the fiber end 23$p$ are disposed accordingly. Then, a surface distance measuring apparatus that exhibits effects similar to those of this embodiment can be realized by adjusting the relative position between the objective lens 55 and the target optical system 60 so that light converges on the same image point or diverge from the same imaginary object point with respect to any measurement target surface 60$k$.

Fifth Embodiment

Figure 8:
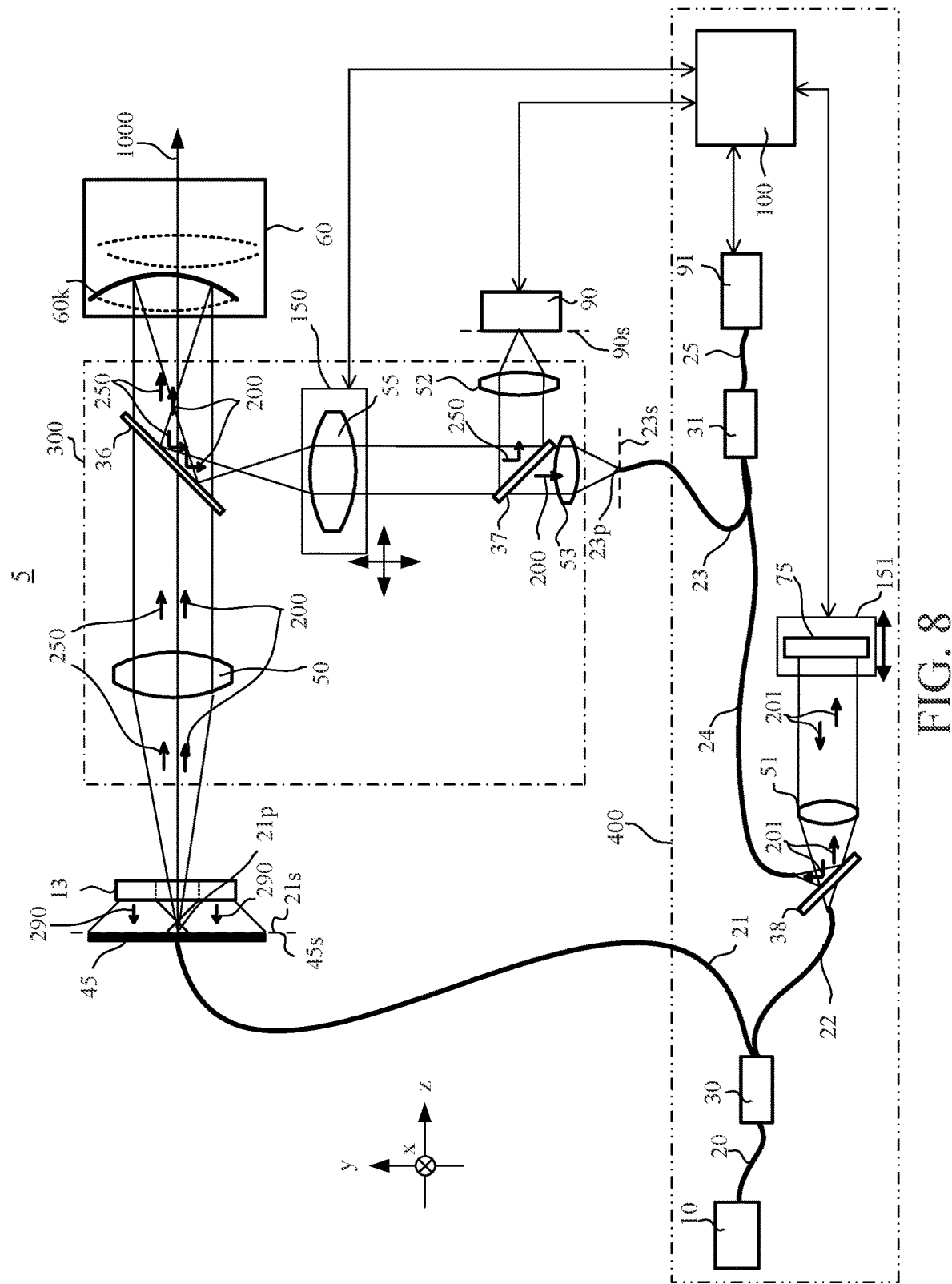
FIG. 8 illustrates a configuration of a surface distance measuring apparatus according to a fifth embodiment.

FIG. 8 illustrates a configuration of a surface distance measuring apparatus 5 according to a fifth embodiment. The surface distance measuring apparatus 5 includes an illumination light source 13, an index chart 45, a measurement optical system 300, an image sensor 90, a stage (adjusting unit) 150, an interferometer 400, and a computer (calculating unit) 100. The measurement optical system 300 includes beam splitters 36 and 37, collimator lenses 50 and 53, an objective lens 55, and an imaging lens 52. The interferometer 400 includes a low-coherence light source 10, fibers 20, 21, 22, 23, 24, and 25, fiber couplers 30 and 31, a beam splitter 38, a collimator lens 51, a mirror 75, a detector 91, a stage (optical path length changing unit, reference stage) 151. The interferometer 400 according to this embodiment is a Mach-Zehnder interferometer.

Light 290 emitted from the illumination light source 13 illuminates the reflection type index chart 45, divergent light (index light) 250 is emitted from the surface 45s of the index chart 45, and the index light 250 enters the measurement optical system 300. The index light 250 incident on the measurement optical system 300 passes through the collimator lens 50 to become parallel light, transmits through the beam splitter 36, and enters the target optical system 60. The index light 250 reflected by the measurement target surface 60k converges or diverges, is emitted from the target optical system 60, is reflected by the beam splitter 36, and enters the objective lens 55. The objective lens 55 is installed on the stage 150 that is movable in the X, Y, and Z directions and the relative position between the objective lens 55 and the target optical system 60 can be adjusted. The position of stage 150 is managed by computer 100.

In a case where the position of the objective lens 55 is adjusted so that the index light 250 transmitted through the objective lens 55 becomes parallel light, the index light 250 is reflected by the beam splitter 37 and imaged on the light receiving surface 90s of the image sensor 90 by the imaging lens 52. An image captured by the image sensor 90 is sent to the computer 100.

The light from the low-coherence light source 10 passes through the fiber 20 and is split into target light 200 and reference light 201 at the fiber coupler 30. The reference light 201 is emitted through the fiber 22. The target light 200 passes through the fiber 21, diverges, and is emitted from the fiber end (ejection point) 21p. The target light 200 emitted from the exit point 21p enters the measurement optical system 300. The target light 200 becomes parallel light by the collimator lens 50, passes through the beam splitter 36, and enters the target optical system 60.

Similarly to the index light 250, the target light 200 reflected by the measurement target surface 60k converges or diverges, is emitted from the target optical system 60, is reflected by the beam splitter 36, passes through the objective lens 55, and becomes parallel light. The target light 200 passes through the beam splitter 37, is condensed by the collimator lens 53, and enters the fiber end (incident point) 23p of the fiber 23.

The target light 200 returned to the fiber end 23p reaches the fiber coupler 31 through the fiber 23. The reference light 201 emitted from the fiber 22 passes through the beam splitter 38, becomes parallel light by the collimator lens 51, is reflected by the mirror 75, passes through the collimator lens 51 again, is reflected by the beam splitter 38, and is reflected by the fiber 24. The reference light 201 incident on the fiber 24 reaches the fiber coupler 31 through the fiber 24. The target light 200 and the reference light 201 interfere with each other at the fiber coupler 31, the interference light passes through the fiber 25 and is received by the detector 91, and its signal is sent to the computer 100.

The mirror 75 is installed on the reference stage 151 that is movable in the arrow direction (Z direction) in FIG. 8, and the optical path length of the reference light 201 can be changed by moving the reference stage 151. Information on the position of the reference stage 151 is sent to the computer 100.

The computer 100 calculates the optical path length of the measurement target surface 60k based on the interference signal. While sequentially changing the measurement target surface, the computer 100 calculates an optical path length of each target surface and a distance between the target surfaces.

In this embodiment, each of the surface 45s of the index chart 45, the surface 21s including the exit point 21p, the surface 23s including the incident point 23p, and the light receiving surface 90s of the image sensor 90 have a conjugate relationship with to each other with respect to the measurement optical system 300. Based on this relationship, in a case where the objective lens 55 is adjusted so that the image of the index chart 45 comes to the reference position, the target light 200 emitted from the exit point 21p inevitably enters the incident point 23p. That is, even if the measurement target surface 60k has a large eccentricity, the optical path length of the measurement target surface 60k can be measured.

Six Embodiment

Figure 9:
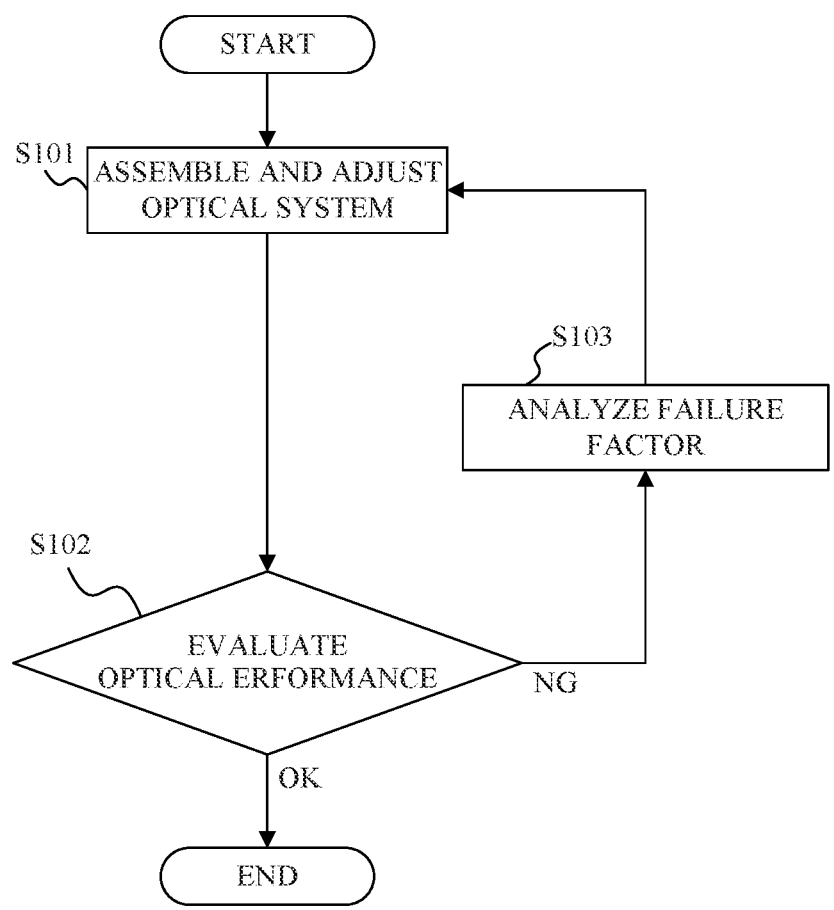
FIG. 9 is a flowchart illustrating an optical system manufacturing method using the surface distance measuring apparatus according to any one of the embodiments.

FIG. 9 is a flowchart illustrating a manufacturing method for an optical system according to a sixth embodiment. This method can feed back the surface distance result of the optical system measured using any one of the surface distance measuring apparatuses 1 to 5 described in the first to fifth embodiments to the manufacturing method of the optical system (target optical system 60).

First, in step S101, a manufacturer assembles an optical system using a plurality of optical elements (lenses, etc.) and adjusts a position of each optical element.

Next, in step S102, the manufacturer evaluates the accuracy and performance of the assembled and adjusted optical system. In a case where a satisfactory evaluation result is not obtained, the flow proceeds to step S103 to analyze the failure factor. One of the analyzed targets is a surface distance between optical elements. Any one of the surface distance measuring apparatuses 1 to 5 can be used to measure this surface distance. On the other hand, in a case where a satisfactory evaluation result is obtained, the manufacturing of the optical system by this manufacturing method is terminated.

In addition to the failure factor analysis in step S103, the measurement result (acquisition result) of the surface distance can also be used to adjust the position of the optical element in step S101. That is, surface distances in a plurality of optical elements in an optical system can be measured (acquired) using any one of the surface distance measuring apparatuses 1 to 5, and the result can be used to adjust the positions of the optical elements.

Even for target surfaces with large eccentricity amounts, this embodiment can acquire a distance between the target surfaces with high accuracy.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-145622, filed on Sep. 13, 2022, which is hereby incorporated by reference herein in its entirety.

What is claimed is:

1. An acquiring apparatus comprising:
a first light source configured to illuminate a chart including an index surface on which an index is provided;
a measurement optical system including an objective lens and configured to cause index light emitted from the chart to enter a target optical system;
an image sensor configured to receive the index light reflected by a plurality of target surfaces in the target optical system via the measurement optical system;
an adjusting unit configured to adjust a relative position between the objective lens and the target optical system so as to image the chart by the index light at a reference position on a light receiving surface of the image sensor;
an interferometer including a second light source, and configured to divide light from the second light source into target light and reference light, and to acquire an interference signal by causing the reference light and the target light that has been emitted from a first point, reflected on the plurality of target surfaces, and incident on a second point via the measurement optical system to interfere with each other; and
a calculating unit configured to calculate a distance between adjacent target surfaces among the plurality of target surfaces based on the interference signal,
wherein the index surface, a surface containing the first point, a surface containing the second point, and the light receiving surface have a conjugate relationship with each other with respect to the measurement optical system.

2. The acquiring apparatus according to claim 1, wherein the calculating unit is configured to calculate each optical path length to the plurality of target surfaces based on the interference signal, and to calculate the distance between adjacent target surfaces among the plurality of target surfaces based on the optical path length.

3. The acquiring apparatus according to claim 1, wherein in a case where an optical axis of the measurement optical system is set to a measurement axis, the adjusting unit adjusts the relative position between the objective lens and the target optical system in parallel and perpendicular directions to the measurement axis.

4. The acquiring apparatus according to claim 1, wherein in a case where an optical axis of the measurement optical system is set to a measurement axis, and an origin of the chart is set to a point where a ray propagating on the measurement axis in the index light is emitted, a pattern formed on the chart is asymmetric with respect to the origin.

5. The acquiring apparatus according to claim 1, wherein the interferometer includes an optical path length changing unit configured to change a reference optical path length that is an optical path length of the reference light, and
wherein after the image of the chart is formed at the reference position by the adjusting unit, the interference signal obtained by scanning the reference optical path length by the optical path length changing unit is acquired.

6. The acquiring apparatus according to claim 1, further comprising a reference plate having an optical path length reference plane between the measurement optical system and the target optical system,
wherein the interferometer acquires a reference interference signal by causing the reference light and the target light reflected by the optical path length reference plane to interfere with each other, and
wherein the calculating unit calculates a reference optical path length of the optical path length reference plane based on the reference interference signal, and corrects each of the optical path lengths to the plurality of target surfaces using the reference optical path length.

7. The acquiring apparatus according to claim 1, wherein the first light source is a light source obtained by guiding part of the light from the second light source through a fiber.

8. The acquiring apparatus according to claim 1, wherein at the reference position, a position of an image of an origin of the chart coincides with a position of a center of curvature of each of the plurality of target surfaces.

9. An acquiring method comprising the steps of:
illuminating using a first light source a chart including an index surface on which an index is provided;
causing index light emitted from the chart to enter a target optical system, and receiving, on an image sensor, the index light reflected by a plurality of target surfaces in the target optical system via a measurement optical system;
adjusting a relative position between an objective lens and the target optical system so as to form an image of the chart by the index light at a reference position on a light receiving surface of the image sensor;
dividing light from a second light source into target light and reference light, and acquiring an interference signal by causing the reference light and the target light that has been emitted from a first point, reflected on the plurality of target surfaces, and incident on a second point via the measurement optical system to interfere with each other; and
calculating a distance between adjacent target surfaces among the plurality of target surfaces based on the interference signal, and,
wherein the adjusting step performs an adjustment while the index surface, a surface containing the first point, a surface containing the second point, and the light receiving surface have a conjugate relationship with each other with respect to the measurement optical system.

10. An optical system manufacturing method comprising the steps of:
acquiring a surface distance in the optical system as the target optical system using the acquiring method according to claim 9; and
adjusting the optical system using an acquisition result of the surface distance.

* * * * *